United States Patent Office

3,419,621
Patented Dec. 31, 1968

3,419,621
HALOGEN CONTAINING ETHER COMPOSITIONS
Pauls Davis, Gibraltar, and Herwart C. Vogt, Grosse Ile, Mich., assignors to Wyandotte Chemicals Corporation, Wyandotte, Mich., a corporation of Michigan
No Drawing. Filed June 27, 1966, Ser. No. 560,796
4 Claims. (Cl. 260—615)

ABSTRACT OF THE DISCLOSURE

Halogen-containing ether compositions prepared by reacting allyl alcohol with halogenated epoxide containing from 3 to 4 carbon atoms and having an alkyl group attached to a carbon atom of the oxirane ring, said alkyl group having a maximum of 2 carbon atoms and containing at least 2 halogen atoms attached to the same terminal carbon atom in the presence of a catalyst.

---

This invention relates to useful halogenous compositions, a process for preparation of such compositions, and for preparation of a novel class of halogen-containing ether epoxides which are particularly useful in the preparation of more complex epoxide-based compositions which have a relatively high order of nonflammability and which, in many cases, are nonburning as well as self-extinguishing.

As used herein, the term "epoxide" denotes a compound characterized by the presence of at least one cyclic ether group, namely, one wherein an ether oxygen atom is attached to two adjacent carbon atoms thereby forming a cyclic structure. The terms "epoxy" and "oxirane ring" also describe the foregoing cyclic ether group.

The commercial potentialities of epoxy-containing resins and related polymeric materials are well recognized by those skilled in the art. The properties of such compositions have made them successful competitors in many applications with other more conventional materials. However, in spite of the excellent physical and chemical properties of such epoxide-based compositions, it has also been found that they possess a major disadvantage and, consequently, a factor which limits the area of their potential use: they are flammable and burn readily.

Accordingly, it is a purpose of this invention to provide a new and useful class of intermediate compounds for producing thermally stable epoxy-containing materials which may be prepared from commercially available materials which are relatively inexpensive and a process for preparation of such intermediate compounds and epoxy-containing materials therefrom which are useful as intermediates in the preparation of polymeric compositions.

It has now been found that the foregoing and additional purposes are accomplished by reacting, generally in the presence of a catalyst, allyl alcohol with halogenated epoxide containing from 3 to 4 carbon atoms and having attached to a carbon atom of the oxirane ring an alkyl group having up to 2 carbon atoms and containing at least 2, and preferably 3, halogen atoms attached to a terminal carbon atom and where the alkyl group contains 2 carbon atoms the second carbon atom may also contain halogen substituents. This produces a halogenated glycol allyl ether characterized by a non-cyclic ether-linked carbon chain having at least 2 halogen atoms attached to one terminal carbon atom and an allyl group at the end of the carbon chain opposite the end to which the halogen atoms are attached. This may, in general, be depicted by the following equation:

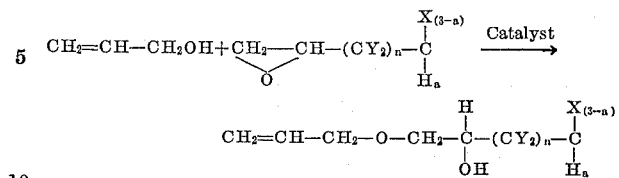

wherein X is halogen, Y is H or halogen, $n$ is an integer from 0 to 1, and $a$ is an integer from 0 to 1. Catalysts which may be used in this reaction are typically those of the Friedel-Crafts type, including anhydrous $AlCl_3$, $BF_3$, $ZnCl_2$, $FeCl_3$, $SnCl_4$, and complexes such as the well-known $BF_3$ etherates, etc.; acid-type catalysts, including HF, $H_2SO_4$, $H_3PO_4$, etc.; and others such as $SbCl_5$.

Since boron trifluoride is a gas at the normal reaction temperatures employed, it is desirable to add the boron trifluoride in the form of a compound or complex of boron trifluoride which is liquid at the reaction temperature. Accordingly, the term "boron trifluoride" as used herein includes boron trifluoride and compounds and complexes of boron trifluoride which facilitate the use of boron trifluoride in the reaction. Ether compounds and complexes of boron trifluoride are preferred. These materials are disclosed and discussed in Boron Trifluoride and Its Derivatives by Harold Simmons Booth and Donald Ray Martin, pages 68–71, John Wiley and Sons, Inc., New York, 1949. In general, compounds and complexes of the lower ethers are preferred since these provide higher percentages of $BF_3$ in the compound or complex. Particularly preferred are the boron trifluoride compounds or complexes of dimethyl ether, diethyl ether, methyl ethyl ether and tetrahydrofuran. A suitable product which is readily available is the well-known commercial product known as boron trifluoride etherate which is primarily the boron trifluoride complex of diethyl ether.

In general, a solvent is desirable and sometimes essential in performing this reaction. However, $SnCl_4$ which is the preferred catalyst may be employed in the absence of a solvent. Organic solvents or diluents which may be used and which are substantially unreactive in this treatment include hydrocarbons such as benzene, toluene, etc.; ethers typified by diethyl ether, dichloroethyl ether, and dioxane; halides such as ethylene dichloride, carbon tetrachloride, etc.

In the above reactions it is possible to vary the proportions of the allyl alcohol and halogenated epoxide over a considerable range. In general, it is preferred to employ equimolar amounts of alcohol and halogenated epoxide. However, this proportion can be varied with the molar proportions of allyl alcohol to halogenated epoxide ranging from about 5:1 to 1:5.

Only small amounts of the more active catalysts such as stannic chloride or boron trifluoride are needed to effect a substantially complete reaction in a short time. Satisfactory results are ordinarily obtained with catalyst concentrations of from a few tenths of 1 percent to 1 percent or more based on the total weight of the reactants, depending on the particular catalyst and reactants. It has been found that less than 0.5 percent by weight $SnCl_4$ may be employed. If desired, more or less than this amount may be used even up to a relatively uneconomic 5 percent by weight of the reactants. Thus, the catalyst can be employed in a range from about 0.01 percent to 5 percent by weight but preferably from 0.01 percent to 1 percent by weight of the total reaction mixture.

Halogenated epoxides having 3 to 4 carbon atoms and at least 2 halogen atoms which may be employed for reaction with the allyl alcohol include 3,3,3-trichloropropylene oxide, 3,3,3-tribromopropylene oxide, 4,4,4-trichlorobutylene-1 oxide, 4,4,4-tribromobutylene-1 oxide, 3,3-dichloropropylene oxide, 4,4-dichlorobutylene-1 oxide, 4,4-dibromobutylene-1 oxide and 3,3-dibromopropylene oxide and oxides of mixed halides such as 3-bromo-3,3-dichloropropylene and 4-bromo-4,4-dichlorobutylene oxides.

The reaction of the allyl alcohol with the halogenated epoxide proceeds smoothly at a temperature of from about 50 to 150° C. and the time required generally ranges from about ½ to 6 hours.

An epoxide compound may be formed from the product of the above reaction, i.e., halogenated glycol allyl ether by first reacting it with a hypochlorite selected from the alkali or alkaline earth metal hypochlorites and an organic acid having a maximum molecular weight of 150. The resulting product is then treated with an alkaline material to accomplish ring closure and thus produce an epoxy group whereby a halogenated glycol glycidyl ether is prepared.

This epoxidation may, in general, be depicted by the following equations:

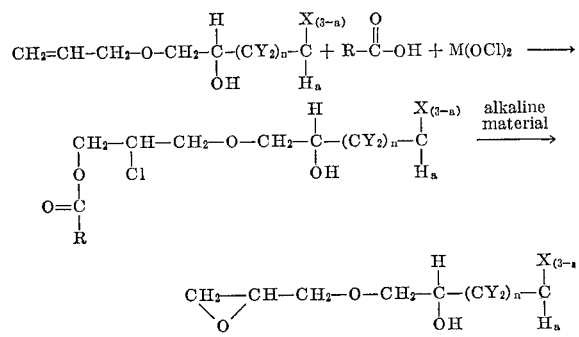

wherein R is an organic group, M is an alkali or alkaline earth metal and $n$, $a$, Y, and X are the same as in the above equation illustrating the first reaction. The mole ratio of halogenated glycol allyl ether to hypochlorite is preferably from about 1:1 to 1:3. The quantity of the alkaline material used for the final step, i.e., epoxidation, may be varied widely. Satisfactory results are ordinarily obtained with sufficient alkaline material to provide a reaction mixture having a pH from about 10 to 14.

The reaction of the halogenated glycol allyl ether with the hypochlorite and organic acid is preferably performed at a temperature of from about 0 to 75° C. while the ring closure in the presence of alkaline material is preferably carried out at a temperature of about 0 to 75° C. All the reactions of this invention may be performed at atmospheric pressure. The time for reaction of the halogenated glycol allyl ether with the hypochlorite and organic acid varies from about 15 minutes to 4 hours while the ring closure step generally requires a period of from about 15 minutes to 4 hours for completion.

Preferred alkali metal or alkaline earth metal hypochlorites which may be employed in the above reaction are the hypochlorites of sodium potassium, lithium, calcium, barium, and magnesium. Preferred organic acids which may be employed in this reaction are acetic acid, propionic acid, monodichloroacetic acid, and trifluoroacetic acid. Numerous alkaline materials are known for ring closure to produce epoxides and all such materials and procedures for using same are contemplated herein. For example, aqueous and anhydrous sodium or potassium or lithium hydroxide may be used. A large number of basic reacting metal salts of strong bases and weak acids are also known for this purpose. Illustrative of such alkaline materials are sodium and potassium carbonates and bicarbonates; borax; hydroxides of magnesium, calcium, barium and the corresponding oxides, etc.

As an alternative, the halogenated glycol allyl ether may be directly epoxidized using peroxide- and peracid-type epoxidizing agents to produce the above-described halogenated glycol glycidyl ether. Among the suitable epoxidizing agents are the following: hydrogen peroxide, organic peracids, activated hydrogen peroxides, and alkaline hydrogen peroxides.

The peracid systems used as epoxidizing agents involving $H_2O_2$ may be further classified as:

(a) preformed acid
(b) acid formed in situ

Peracetic acid may also be prepared by the autoxidation of acetaldehyde. Other organic peracids which may be used are:

(1) perbenzoic acid
(2) monoperphthalic acid
(3) peroxytrifluoroacetic acid
(4) metachloroperbenzoic acid Peracetic acid is commercially available. It can be readily formed by mixing 1.6 moles of glacial acetic acid with 1 mole of 90% hydrogen peroxide in the presence of about 2–3% sulfuric acid. Acetic anhydride may also be added to displace the equilibrium by removing water. The catalyst may be a cation exchange resin such as poly(styrenesulfonic acid) resin in the acid form.

When hydrogen peroxide is used as the basic peroxide, the reaction involves two stages. In the first stage, the hydrogen peroxide is mixed with an organic acid as, for example, acetic acid to form an equilibrium mixture containing peracetic acid:

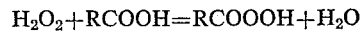

In the second stage, the peracetic acid is reacted with an olefinic double bond of the copolymer to form the epoxide:

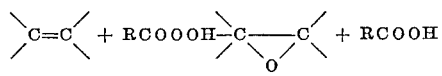

In addition to the primary reaction, side reactions may take place and may even predominate if not carefully controlled, such as the formation of hydroxyacyloxy and glycol derivatives by further cleavage of the epoxy ring:

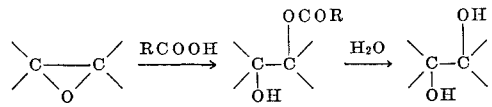

The side reactions may be controlled by careful selection of reaction temperature and other conditions, as is well known in the art for such type reactions.

The amount of epoxidizing agent to be used depends on the compound used as epoxidizing agent, upon the reaction conditions, and the amount of unsaturation in the compound to be epoxidized.

The practice of this invention will be more completely understood by reference to the following examples.

Example I

In a twelve-liter, round-bottom flask equipped with a condenser, stirrer, thermometer, and dropping funnel, 3228 grams (20.0 moles) of 3,3,3-trichloropropylene oxide, 1162 grams (20.0 moles) allyl alcohol, and 7 grams tin tetrachloride catalyst are reacted in cumulative batches. The reaction is controlled by adding increments of approximately 250–300 milliliters of a mixture of the alcohol and 3,3,3-trichloropropylene oxide to the reaction mixture which contains the catalyst, which is also added in increments of approximately 0.5 milliliter. The average reaction temperature is 110 to 140° C. and the total reaction time is 1½ hours. The product is then isolated by distillation. The product is a colorless liquid weighing 3840 grams (87% yield) which melts at 22° C. and is soluble in polar as well as non-polar solvents, except water. Infrared spectrum supports the presence of OH, C—O—C, C—Cl$_3$, and C=C structure.

A chlorine content of 48.6 weight percent by analysis is obtained along with a molecular weight as obtained by the ebulliometric technique of 212.

Example II

In a twelve-liter, round-bottom flask equipped with a condenser, stirrer, thermometer, and dropping funnel, 3508 grams (20 moles) of 4,4,4-trichlorobutylene-1 oxide, 1162 grams (20 moles) allyl alcohol and 7 grams tin tetrachloride catalyst are reacted in cumulative batches. The reaction is controlled by adding increments of approximately 250–300 milliliters of a mixture of the alcohol and 4,4,4-trichlorobutylene-1 oxide to the reaction mixture which contains the catalyst, which is also added in increments of approximately 0.5 milliliter. The average reaction temperature is 110 to 135° C. and the total reaction time is 2 hours. The product is then isolated by distillation. The product is a light colored liquid which contains 45.7 weight percent chlorine, has a molecular weight of 233.5 and is soluble in polar as well as non-polar solvents.

Example III

In a twelve-liter, round-bottom flask equipped with a condenser, stirrer, thermometer, and dropping funnel, 2060 grams (10 moles) of 3-bromo-3,3-dichloropropylene oxide, 581 grams (10 moles) allyl alcohol and 4 grams tin tetrachloride catalyst are reacted in cumulative batches. The reaction is controlled by adding increments of approximately 250 milliliters of a mixture of the alcohol and 3-bromo-3,3-dichloropropylene oxide to the reaction mixture which contains the catalyst, which is also added in increments of approximately 0.5 milliliter. The average reaction temperature is 110 to 140° C. and the total reaction time is 2½ hours. The product is then isolated by distillation. The product is a yellow colored liquid which contains 19.5 weight percent chlorine, 30 weight percent bromine, and has a molecular weight of 264 and is soluble in polar as well as non-polar solvents.

Example IV

In a twelve-liter, round-bottom flask equipped with a condenser, stirrer, thermometer, and dropping funnel, 2540 grams (20 moles) of 3,3-dichloropropylene oxide, 1162 grams (20 moles) allyl alcohol and 8 grams tin tetrachloride catalyst are reacted in cumulative batches. The reaction is controlled by adding increments of approximately 250–300 milliliters of a mixture of the alcohol and 3,3-dichloropropylene oxide to the reaction mixture which contains the catalyst, which is also added in increments of approximately 0.5 milliliter. The average reaction temperature is 100 to 120° C. and the total reaction time is 2 hours. The product is then isolated by distillation. The product is a light colored liquid which contains 38.3 weight percent chlorine, has a molecular weight of 185 and is soluble in polar as well as non-polar solvents.

Example V

In a one-liter, round-bottom flask equipped with a condenser, stirrer, thermometer, and dropping funnel, 112.8 grams (1 mole) of 3,3,3-trifluoropropylene oxide, 58.1 grams (1 mole) allyl alcohol and 1 gram tin tetrachloride catalyst are reacted in cumulative batches. The reaction is controlled by adding increments of approximately 20–25 milliliters of a mixture of the alcohol and 3,3,3-trifluoropropylene oxide to the reaction mixture which contains the catalyst, which is also added in increments of approximately 0.1 milliliter. The average reaction temperature is 50 to 100° C. and the total reaction time is 3 hours. The product is then isolated by distillation. The product is a colorless liquid which contains 33.4 weight percent fluorine, has a molecular weight of 171 and is soluble in polar as well as non-polar solvents.

Example VI

A portion of the product of Example I, 110 grams (0.5 mole) dissolved in 300 grams (5.0 moles) of acetic acid, is placed in a one-liter, three-neck flask provided with a condenser, stirrer, and dropping funnel. 55 grams of calcium hypochlorite dissolved in 350 milliliters of water are then gradually added through the dropping funnel. In order to maintain the temperature at 50° C., the material is cooled by running water over the outside of the flask. At the end of the addition, 500 milliliters of water are added and the oils extracted with methylene chloride. The organic layer is washed with sodium bicarbonate solution, water, and dried before being stripped. 144 grams (92.3% yield) of the product, a yellowish colored oil, is obtained. The product contains 43.4% chlorine by analysis.

Ring closure is achieved by vigorously stirring 31 grams (0.1 mole) of the above product with 8 grams (0.2 mole) of sodium hydroxide in 50 milliliters of water in a one-liter flask whereby an exotherm raises the temperature to 60° C. The epoxide product is extracted with methylene chloride, washed, dried, and stripped giving 23 grams of a light straw-yellow oil containing 5.27 percent by weight oxirane oxygen, 47.3 percent by weight chlorine, and having a molecular weight of 235.

Example VII

A product is prepared by the process of Example VI with the exception that propionic acid is employed in lieu of acetic acid and sodium hypochlorite is employed in lieu of calcium hypochlorite. The product is substantially the same as that of Example VI.

Example VIII

A product is prepared by the process of Example VI with the exception that monochloroacetic acid is employed in lieu of acetic acid and potassium hypochlorite is employed in lieu of calcium hypochlorite. The product is substantially the same as that of Example VI.

Example IX

A product is prepared by the process of Example VI with the exception that trifluoroacetic acid is employed in lieu of acetic acid and lithium hypochlorite is employed in lieu of calcium hypochlorite. The product is substantially the same as that of Example VI.

Example X

A product is prepared by the process of Example VI with the exception that dichloroacetic acid is employed in lieu of acetic acid and magnesium hypochlorite is employed in lieu of calcium hypochlorite. The product is substantially the same as that of Example VI.

Example XI

A product is prepared by the process of Example VI with the exception that potassium hydroxide is employed in lieu of sodium hydroxide in the final step of the process. The product is substantially the same as that of Example VI.

Example XII

A product is prepared by the process of Example VI with the exception that calcium hydroxide is employed in lieu of sodium hydroxide in the final step of the process. The product is substantially the same as that of Example VI.

Example XIII

A product is prepared by the process of Example VI with the exception that barium hydroxide is employed in lieu of sodium hydroxide in the final step of the process. The product is substantially the same as that of Example VI.

Example XIV

A portion of the product of Example II, 117 grams (0.5 mole) dissolved in 300 grams (5.0 moles) of acetic acid, is placed in a one-liter, three-neck flask provided with a condenser, stirrer, and dropping funnel. 55 grams of calcium hypochlorite dissolved in 350 milliliters of water are then gradually added through the dropping funnel. In order to maintain the temperature at 50° C., the material is cooled by running water over the outside of the flask. At the end of the addition, 500 milliliters of water are added and the oils extracted with methylene chloride. The organic layer is washed with sodium bicarbonate solution, water, and dried before being stripped. 140 grams of the product, a straw colored oil, is obtained. The product contains 50.1 percent by weight chlorine.

Ring closure is achieved by vigorously stirring 140 grams of the above product with 22 grams of sodium hydroxide in 50 milliliters of water in a one-liter flask whereby an exotherm raises the temperature to 60° C. The epoxide product is extracted with methylene chloride, washed, dried, and stripped giving a light straw-yellow oil containing 5.0 percent by weight of oxirane oxygen, 43.2 percent by weight chlorine, and having a molecular weight of 249.

Example XV

A product is prepared by the process of Example XIV with the exception that potassium hydroxide is employed in lieu of sodium hydroxide in the final step of the process. The product is substantially the same as that of Example XIV.

Example XVI

A product is prepared by the process of Example XIV with the exception that propionic acid is employed in lieu of acetic acid and sodium hypochlorite is employed in lieu of calcium hypochlorite. The product is substantially the same as that of Example XIV.

Example XVII

In a two-liter, round-bottom flask equipped with a thermometer, stirrer, and condenser, 110 grams of the product of Example I are dissolved in 250 milliliters of acetic acid and 4.7 grams of sodium acetate as buffer are added. The mixture is cooled to 20° C. and 95.5 grams of a 40% peracetic acid solution are slowly added over one hour at controlled temperature of 20–25° C. The mixture is heated by means of a water bath to 60° C. and maintained at this temperature for about one hour. At this time the acetic acid solution is cooled to room temperature, washed with 2 liters of a 20% NaCl solution, followed by a water wash, extracted with benzene and the benzene solution dried overnight with MgSO₄, filtered, and stripped of solvent. 118 grams of a light straw-yellow oil are isolated containing by weight 5.5 percent oxirane oxygen, 47.8 percent chlorine and having a molecular weight of 235.

Example XVIII

In a two-liter, round-bottom flask equipped with a thermometer, stirrer, and condenser, 88 grams of the product of Example III and 2.8 grams of sodium acetate as buffer are added. The mixture is cooled to 20° C. and 57.3 grams of a 40% peracetic acid solution are added over a period of 60 minutes. The mixture is then heated by means of a water bath to 60° C. and maintained at this temperature for about 3 hours. At this time 200 milliliters benzene are added, the mixture is cooled to room temperature and then washed with one liter of a 20% NaCl solution, followed by a water wash. The benzene solution is dried overnight with MgSO₄, filtered, and stripped of solvent. 90 grams of product are isolated containing by weight 5.7 percent oxirane oxygen, 47 percent halogen (chlorine and bromine), and has a molecular weight of 280.

It is to be understood that various changes and modifications may be made in the foregoing composition and process without departing from the spirit of the invention and scope of the appended claims.

What is claimed is:

1. A halogen-containing ether composition of matter having a structure depicted by the following formula:

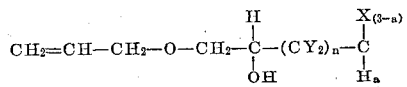

wherein X is halogen, Y is H or halogen, $n$ is an integer from 0 to 1, and $a$ is an integer from 0 to 1.

2. Composition as defined in claim 1 in which X is chlorine and Y is hydrogen.
3. Composition as defined in claim 1 in which $n$ is 0.
4. Composition as defined in claim 1 in which $n$ is 1.

References Cited

UNITED STATES PATENTS

| | | | |
|---|---|---|---|
| 2,260,753 | 10/1941 | Marple et al. | 260—615 XR |
| 2,327,053 | 8/1943 | Marple et al. | 260—611 |
| 2,380,185 | 7/1945 | Marple et al. | 260—615 |
| 2,778,855 | 1/1957 | Shukal et al. | 260—615 XR |
| 3,318,960 | 5/1967 | Earing | 260—615 |

LEON ZITVER, *Primary Examiner.*

H. MARS, *Assistant Examiner.*

U.S. Cl. X.R.

260—348.5, 348.6, 496, 497, 348